United States Patent [19]

Vatt

[11] Patent Number: 5,423,084
[45] Date of Patent: Jun. 6, 1995

[54] SPECTRUM RECOVERY APPARATUS AND METHOD THEREFOR

[75] Inventor: Gregory B. Vatt, Mesa, Ariz.

[73] Assignee: Motorola, Inc., Schaumburg, Ill.

[21] Appl. No.: 881,120

[22] Filed: May 11, 1992

[51] Int. Cl.$^6$ .............................................. H04Q 7/36
[52] U.S. Cl. .................. 455/13.1; 455/33.2; 455/54.1; 455/62
[58] Field of Search ............ 455/13.1, 12.1, 13.2, 455/17, 13.3, 15, 19, 20, 33.1, 33.2, 33.3, 33.4, 38.1, 53.1, 54.1, 56.1, 62, 63, 50.1

[56] References Cited

U.S. PATENT DOCUMENTS

| | | | |
|---|---|---|---|
| 4,578,815 | 3/1986 | Persinotti | 455/62 X |
| 5,019,317 | 4/1991 | Schwendeman et al. | 340/311.1 |
| 5,161,248 | 11/1992 | Bertiger et al. | 455/17 |
| 5,239,671 | 8/1993 | Linquist et al. | 455/13.1 |
| 5,276,908 | 1/1994 | Koohgoli | 455/13.1 |

FOREIGN PATENT DOCUMENTS

| | | | |
|---|---|---|---|
| 0470831 | 8/1991 | European Pat. Off. | H04Q 7/04 |
| 3706240 | 2/1987 | Germany | H04Q 7/02 |
| 4091522 | 3/1992 | Japan | 455/62 |

Primary Examiner—Reinhard J. Eisenzopf
Assistant Examiner—Philip J. Sobutka
Attorney, Agent, or Firm—Robert M. Handy; Harold C. McGurk, IV

[57] ABSTRACT

A controller operates with a cellular communication system that transmits primary communications. The controller recovers a portion of the spectrum assigned to the primary communications for reuse in transmitting secondary communications. The primary communications' cells move in a predictable manner relative to a site at which the controller is located. The controller monitors primary communications to determine the current active cell. The identities of past active cells are saved so that a historical sequence of active cells is available. A map defining the relative orientation of cells is used with the historical sequence information to predict tracks through newly entered active cells. Based on this prediction, a recoverable cell is selected. Communication link parameters of the recoverable cell are used for secondary communications. The identity of the recoverable cell changes in response to changes in the identity of the active cell.

19 Claims, 7 Drawing Sheets

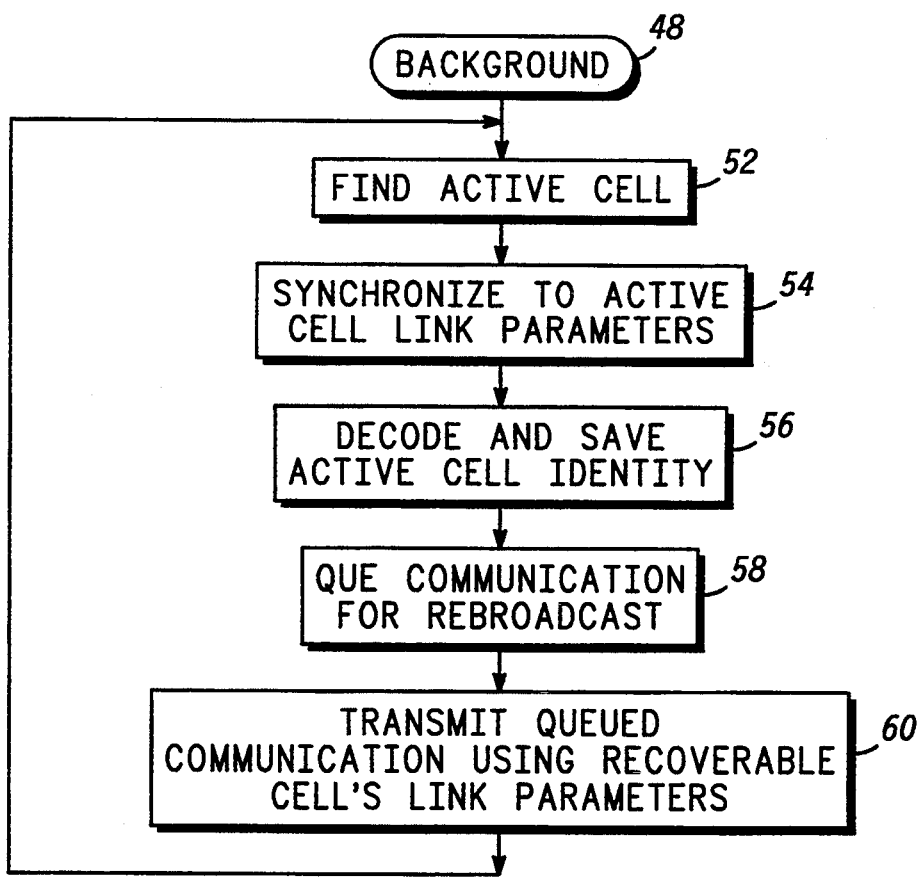

| LINK PARAMETER TABLE | | | 116 |
|---|---|---|---|
| CELL | TRANSMIT TIME SLOT | OTHER PARAMETER | |
| A | 1 | — | |
| B | 3 | — | |
| C | 5 | — | |
| D | 7 | — | |
| E | 9 | — | |
| F | 11 | — | |
| G | 13 | — | |

*FIG. 9*

SPECTRUM RECOVERY APPARATUS AND METHOD THEREFOR

TECHNICAL FIELD OF THE INVENTION

The present invention relates generally to cellular RF communications. More specifically, the present invention relates to recovering spectrum that is otherwise unavailable within a cellular communication system.

BACKGROUND OF THE INVENTION

Simplex data communication systems, also known as one-way or passive systems, are employed in connection with paging. Generally speaking, one or more transmitters broadcast data communications. The communications include data which identify specific pagers. A population of pagers continually receive the broadcast communications. Conventional paging systems experience several problems, one of which is related to a limited range capability. A paging system works only when its pagers reside within the area covered by the system's transmitters. When subscribers travel outside this area, their pagers cannot receive calls. Another problem with conventional paging systems is concerned with multipathing, interference, signal reflections, and the like. Pagers are worn by users who often place themselves inside automobiles, inside buildings, near large grounded structures, and in other spaces that electromagnetic paging signals have trouble penetrating. Consequently, the pagers' ability to receive communications is poor in urban areas, which typically include many interfering structures.

To address the limited range and interference problems, some paging systems employ a simulcast technique wherein multiple simultaneously operated transmitters are positioned at spaced apart locations. An increase in power resulting from multiple transmitters and a diversity of signal propagation paths from spaced apart transmitters improve reception. In addition, the spacing between transmitters extends the coverage area by the spacing distance. While this solution is practical in urban areas, it is far too costly for extending paging services to include less populated areas with the urban areas.

The use of satellites in paging has been proposed. The use of satellites may address the limited range problem of conventional pager systems. However, the use of satellites presents its own problems. For example, satellites are typically constrained to using only low-power transmissions. Accordingly, satellites are currently used only to broadcast to terrestrial repeaters which can then rebroadcast high power signals to nearby pagers. This accomplishes nothing toward extending the range beyond that achieved by the terrestrial repeaters because the current page receiving equipment, or pagers, cannot receive the satellites' signals. In addition, a double allotment of spectrum is required for delivery of pages. One communication link delivers page communications from satellites to terrestrial repeaters and another communication link delivers page communications from the terrestrial repeaters to the pagers.

A proposal has been made to integrate a satellite with terrestrial transmitters in a simulcast paging system. However, such a simulcast paging system requires a satellite to be positioned in a geostationary orbit. Since geostationary orbits are achieved at around 35,000 km (22,000 miles) above the earth, signals broadcast from stationary satellites are weak at the surface of the earth. Reception at the surface of the earth, without the use of large antennas for receiving the signals would be unreliable. Accordingly, pagers in such a system need to incorporate impractically large and expensive receiving equipment or forgo any simulcast benefit from satellite transmissions.

Another proposal has been made to utilize dual-mode pagers which can receive both satellite-transmitted pages and terrestrial-transmitted pages. In this system, the satellite-transmitted pages are rebroadcast as terrestrial-transmitted pages. Satellites may be placed in low earth, moving orbits. Accordingly, terrestrial-transmitted pages use a different communication link than the satellite-transmitted pages to prevent interference with the satellite-transmitted pages. Moreover, except in the interference-prone urban areas where terrestrial-transmitted pages are available, pagers may reliably receive satellite-transmitted signals because these signals originate only a few hundred miles above the earth. On the other hand, the use of dual-mode receivers increases the size, weight, power consumption, and cost of the pager. In addition, the amount of spectrum needed to transmit pages is twice that required to transmit pages over only a single communication link.

SUMMARY OF THE INVENTION

Accordingly, it is an advantage of the present invention that an improved communication system is provided.

Another advantage of the present invention is that a portion of a communication spectrum geographically allocated in a cellular pattern is recovered for reuse.

Yet another advantage is that the present invention transmits data, such as pages or other forms of communications, using a communication link assigned to an inactive cell of the cellular pattern without causing interference in that inactive cell.

Another advantage of the present invention is that a paging system is provided which utilizes a constellation of satellites in low-earth orbits, which rebroadcasts satellite signals in various locations from terrestrial transmitters, and which utilizes only single mode pagers.

The above and other advantages of the present invention are carried out in one form by a method of recovering a portion of a communication spectrum geographically allocated in a cellular pattern in which, for a given site, one cell is an active cell and a plurality of cells are inactive cells. The method calls for receiving, at the site, a signal in accordance with a first set of link parameters. This first set of parameters is associated with the active cell. A second set of link parameters is predicted from the first set of parameters. The second set of parameters is associated with one of the inactive cells. This one inactive cell is chosen so that communications taking place in it are unlikely to be interfered with by a transmission using spectrum defined by the second set of parameters. A communication is then transmitted using a communication spectrum defined by the second set of link parameters

BRIEF DESCRIPTION OF THE DRAWINGS

A more complete understanding of the present invention may be derived by referring to the detailed description and claims when considered in connection with the Figures, wherein like reference numbers refer to similar items throughout the Figures, and:

FIG. 5 shows a flow chart of a Background procedure performed by the secondary communication controller;

FIG. 7. shows a path table maintained in a memory of the secondary communication controller;

FIG. 9 shows a link parameter table maintained in the memory of the secondary communication controller.

DETAILED DESCRIPTION OF THE PREFERRED EMBODIMENTS

Figure 1:
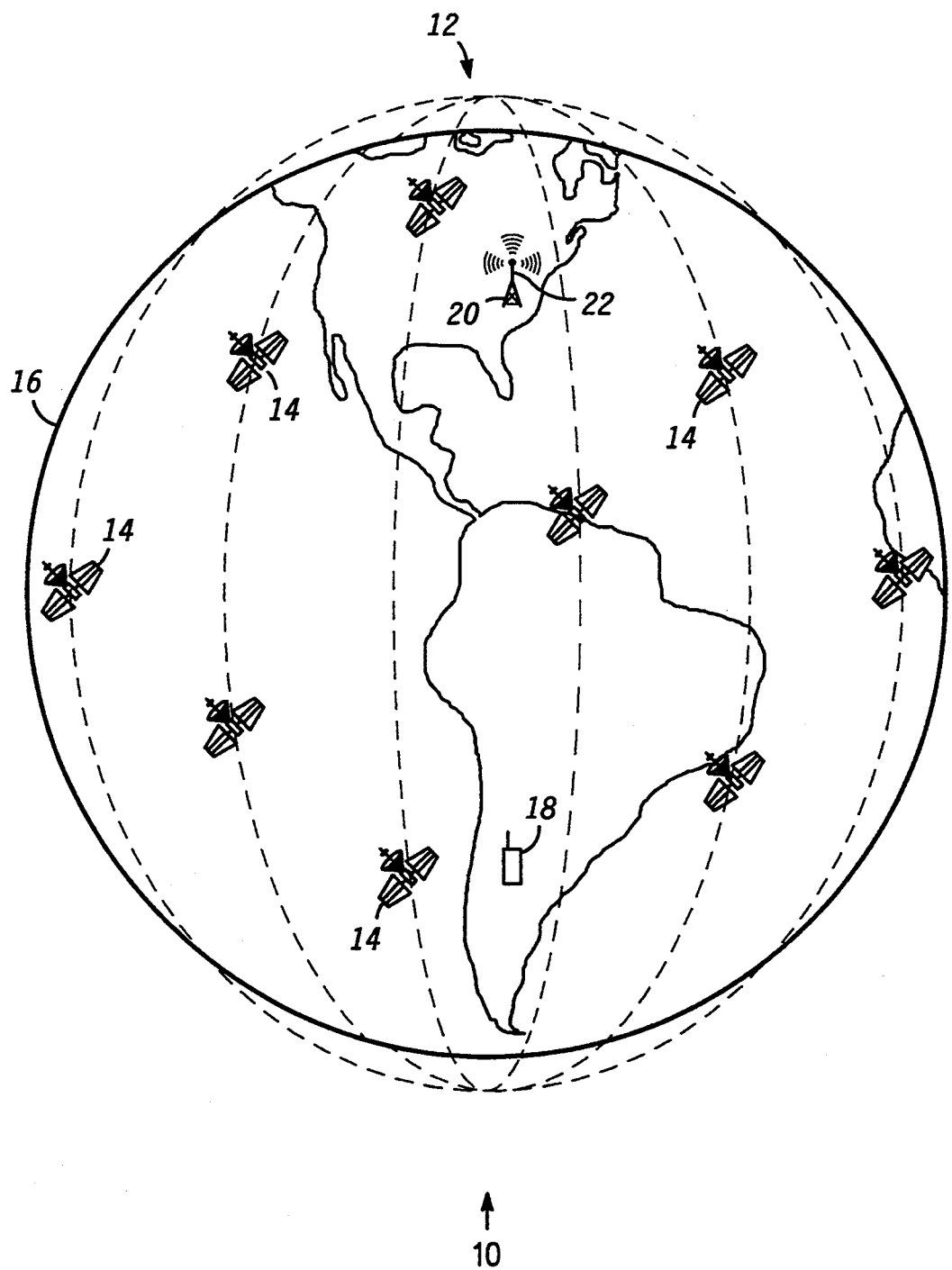
FIG. 1 shows a layout diagram of a satellite-based cellular communication system.

FIG. 1 shows a layout diagram of an environment 10 configured in accordance with a preferred embodiment of the present invention. A constellation 12 includes several satellites 14 placed in a relatively low orbit around the earth 16. Each of satellites 14 represents a node of a communications network formed, at least in part, by constellation 12. Due to the low earth orbits, satellites 14 constantly move relative to the earth. If, for example, satellites 14 are placed in orbits which are around 765 km above the earth, then an overhead satellite 14 travels at a speed of around 25,000 km/hr with respect to a point on the surface of the earth. This allows a satellite 14 to be within view of a point on the surface of the earth for a maximum period of around nine minutes. Due to the relatively low orbits of satellites 14, substantially line-of-sight electromagnetic transmissions from any one satellite cover a relatively small area of the earth at any point in time. For example, when satellites 14 occupy orbits at around 765 km above the earth, such transmissions cover areas around 4075 km in diameter.

Constellation 12 is preferably configured so that communication may take place between any location on the surface of the earth and at least one of satellites 14 at any time. Thus, a communication unit 18, represents only one of a population of communication units, and this population may number in the millions. Communication unit 18 may be carried or installed practically anywhere on the surface of the earth and still receive communication services from constellation 12. In accordance with one embodiment of the present invention, one service which communication unit 18 may receive is a paging service. Thus, unit 18 may continuously monitor communication signals transmitted from nearby satellites 14 of constellation 12 to detect page communications directed to it. Signals transmitted directly from satellites 14 are considered primary communications for the purposes of the present invention.

Those skilled in the art will appreciate that since unit 18 may be carried anywhere in the world, reception by unit 18 may vary considerably depending upon the unit's surroundings. For example, when unit 18 is located in basements, near mountains, in or near large buildings, in automobiles, and the like, primary communications may be unreliable. Many of these interfering structures are commonplace in urban areas.

Environment 10 additionally includes a secondary communication controller 20. Controller 20 is preferably located near the surface of the earth at a site 22 where clear and reliable reception of primary communications occurs. Such locations may, for example, be on towers, on tall buildings, and the like. Compared to satellites 14 such elevated sites are still close to the earth. While controller 20 may be mobile, any movement of controller 20 relative to the movement of satellites 14 is desirably insignificant. Environment 10 may include any number of controllers 20.

In one embodiment of the present invention, controller 20 is located in urban areas where it monitors primary page communications transmitted from constellation 12 and rebroadcasts the page communications as secondary communications. These secondary communications utilize a portion of the spectrum used by the primary communications without causing interference with the primary communications. In this embodiment, controller 20 acts as a terrestrial rebroadcasting station for page communications. In another embodiment, controller 20 monitors primary communications transmitted from constellation 12 to determine how other independent secondary communications may take place utilizing a portion of the primary communications' spectrum without causing interference with the primary communications.

Figure 2:
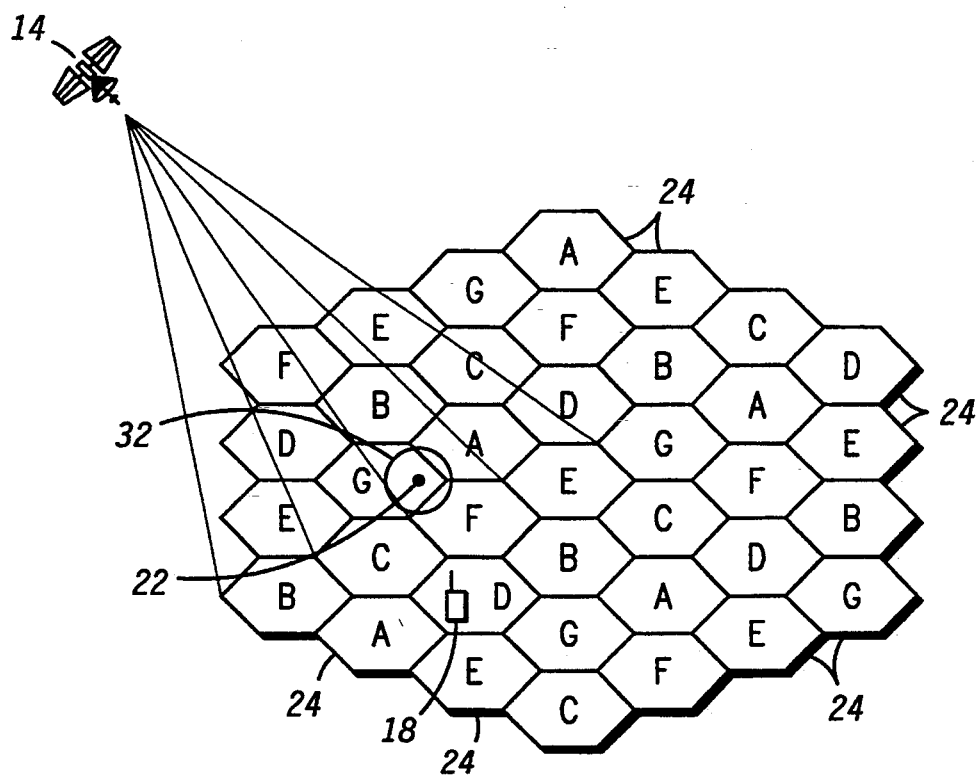
FIG. 2 shows a layout diagram of a cellular pattern formed on the surface of the earth by signals transmitted from a satellite.

FIG. 2 shows a layout diagram of a cellular antenna pattern achieved by satellites 14. As shown in FIG. 2, each satellite 14 includes an array (not shown) of directional antennas. Each array projects numerous discrete antenna patterns on the earth's surface at numerous diverse angles away from its satellite 14. FIG. 2 shows a diagram of a resulting pattern of cells 24 that satellites 14 collectively form on the surface of the earth. For convenience, FIG. 2 illustrates cells 24 as being discrete hexagonal shapes without overlap or gaps. However, those skilled in the art will understand that in actual practice equal strength lines may be more circular than hexagonal, that antenna side lobes may distort the pattern, and that some overlap between adjacent cells may be expected.

With satellites 14 positioned at 765 km above the earth, cells 24 are around 690 km in diameter. With satellites 14 traveling at speeds of up to 25,000 km/hr with respect to the earth, cells 24 also travel over the earth at close to this speed, and any given point on the surface of the earth resides within a single cell 24 for no more than around one minute.

Figure 3:
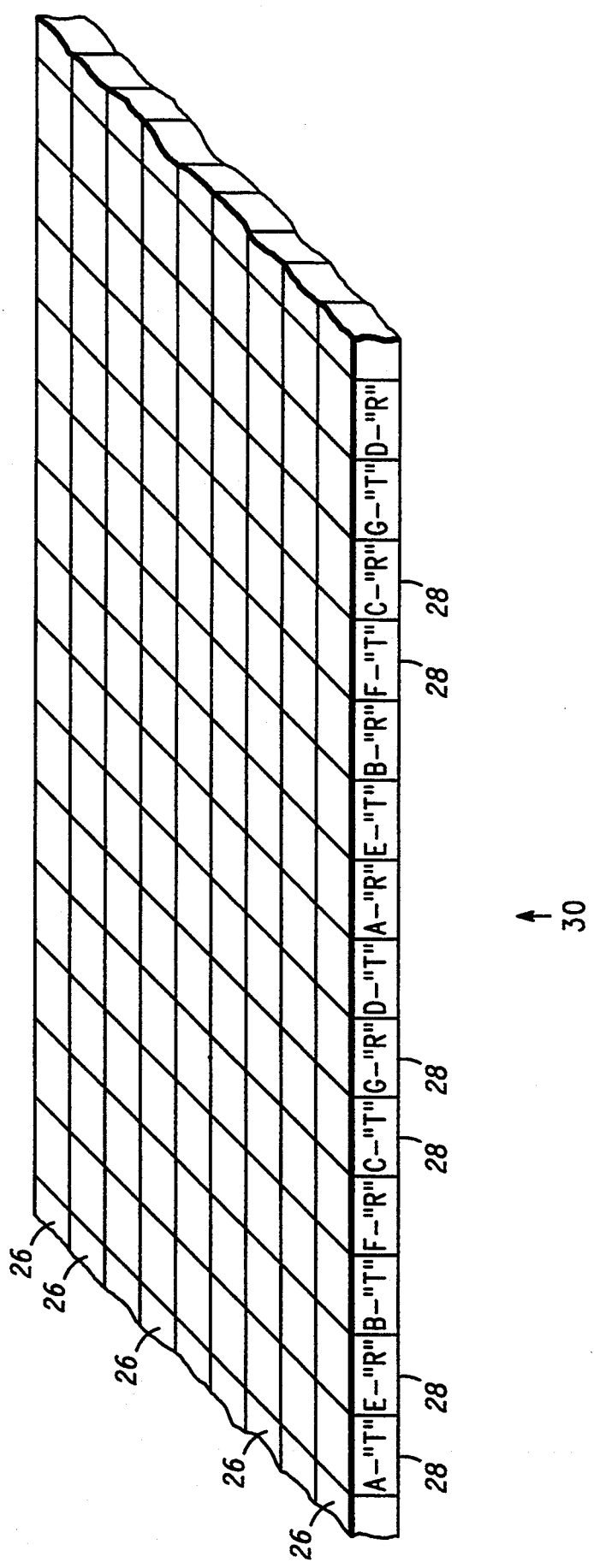
FIG. 3 shows a block diagram of an exemplary spectrum utilized in the cellular communication system.

Primary communications within environment 10 (see FIG. 1) occupy a given amount of spectrum, which is illustrated in FIG. 3. This spectrum is preferably divided into any number, potentially in the thousands, of frequency channels 26. Thus, this communication system employs a frequency division multiple access (FDMA) scheme so that numerous independent communication links may be established simultaneously without interference. In the preferred embodiments, channels 26 reside in or around the L band, but those skilled in the art will appreciate that other frequency bands could be used.

With reference to FIGS. 2 and 3, the entire spectrum of these numerous frequency channels may be available within each cell 24. For example, a seven-cell frequency reuse pattern may be implemented using time division multiple access (TDMA) techniques to prevent interference between adjacent cells. In other words, while the entire spectrum may be available in each cell, the spectrum can be divided in time so that adjacent cells are assigned different time slots 28 within which the spectrum may be used. Thus, for purposes of the present invention, the spectrum may be divided and specified using one or more of time and frequency parameters. Primary communications are desirably divided into frames 30 that could include, for example, at least seven different time slots 28 to correspond to the seven-cell reuse pattern. In addition, different time slots 28 may be allocated to the transmission of signals from satellites 14 and to the reception of signals at satellites 14. FIG. 3 depicts two time slots 28 for each cell 24. Satellites 14 transmit communications to the indicated cell 24 in a transmit (T) time slot 28 and may receive communications from the indicated cell 24 in a different receive (R) time slot 28.

In the preferred embodiment, a burst of digital data is transmitted at a high data rate within a single time slot 28. Of course, those skilled in the art will appreciate that the lowest data rate which can support a needed capacity is preferred. For example, if one frequency channel 26 is dedicated to the transmission of page communications, then a burst of data within that frequency channel may convey the identification of the cell corresponding to the time slot utilized for the communication, addresses of several units 18 being paged, and message data being conveyed by the page communications.

Cells 24 labeled with the letter "A" in FIG. 2 are assigned one time slot 28, cells 24 labeled with the letter "B" are assigned another time slot 28, and so on. That way, cells 24 which utilize the same spectrum at the same time are geographically spaced apart from one another. While FIGS. 2-3 illustrate a seven-cell, seven time slot arrangement, those skilled in the art will understand that a larger or smaller reuse pattern can also be used and that not all transmit time slots 28 require a corresponding receive time slot 28, or vice-versa.

Cells 24 may be viewed as being active or inactive. An active cell 24 is the single cell within whose jurisdiction a receiving apparatus currently resides. All remaining cells 24 are inactive cells. For example, with reference to FIG. 2, if a communication unit 18 resides within a "D" cell, then the "D" cell is active and cells "A", "B", "C", "E", "F", and "G" are inactive. The active cell will not remain active indefinitely because the movement of cells causes the currently active cell move away from the receiving apparatus and thus to become inactive. When one active cell becomes inactive, another cell moves over the receiving apparatus to become active. The particular inactive cell which becomes active depends upon the direction of movement of cells 24.

FIG. 2 additionally depicts, as an example, a site 22 at which a "G" cell 24 is currently active. Site 22 is surrounded by a sub-cell 32, which represents an antenna pattern at which secondary communication signals broadcast from site 22 have approximately the same strength that primary communications have at the borders of cells 24. Sub-cell 32 is smaller than cells 24, and preferably has a diameter no greater than the radius of a cell 24. The reduction in size is desirably caused by locating controller 20 near the surface of the earth rather than in orbit above the earth. With substantially line-of-sight RF communications, the power level at which secondary communications are transmitted from controller 20 may be substantially greater than those from satellites 20 and still maintain sub-cell 32 at its small size.

With reference to the example placement of site 22 illustrated in FIG. 2, secondary communications transmitted from site 22 may not use the same transmission link parameters, such as frequency, time slot, and modulation technique, that are being used in cells "G", "A" and "F" because interference would certainly result. In addition, portions of cells "B" and "C" reside so near sub-cell 32 that interference might possibly result. However, no "D" cell 24 resides closer to sub-cell 32 than a radius of cell 24, and interference in this cell is unlikely. In fact, for the location of site 22 shown in FIG. 2, a "D" cell 24 is the least likely one of the inactive cells to experience interference. In other words, at the instant in time depicted in FIG. 2, secondary communications may utilize the link parameters used in "D" cells 24 without causing interference with primary communications currently taking place in the "D" cells 24.

Due to the seven cell reuse pattern illustrated in FIG. 2, at least one of inactive cells 24 is at least a distance equal to a radius of a cell 24 away from any point within an active cell 24. Controller 20 (see FIG. 1) predicts which single inactive cell 24 best meets these criteria at any given instant. Primary communications in this single inactive cell are the least likely primary communications to be interfered with by secondary communications. This single inactive cell 24 is referred to below as the recoverable cell. The identity of the recoverable cell changes as satellites 14 move overhead. Controller 20 dynamically controls secondary communications to take place using only link parameters that are used in recoverable cells. Accordingly, spectrum allocated to the recoverable cells is recovered for use by secondary communication which may take place within sub-cell 32.

Figure 4:
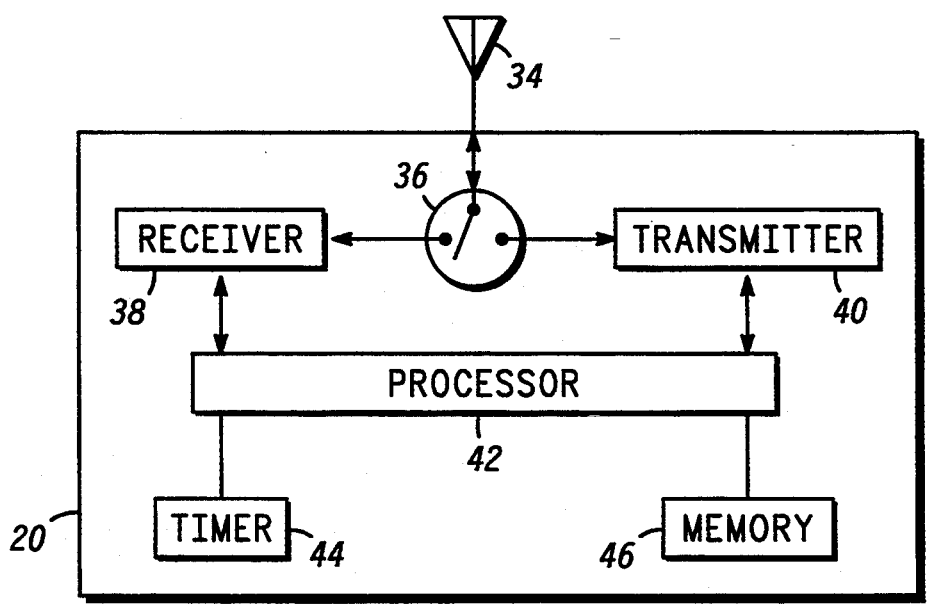
FIG. 4 shows a block diagram of a secondary communication controller.

FIG. 4 shows a block diagram of controller 20. Controller 20 includes an antenna 34 which couples to a switch or splitter 36. Signals received at antenna 34 are routed through splitter 36 to a receiver 38. Signals to be transmitted from controller 20 are routed from a transmitter 40 through splitter 36 to antenna 34. Receiver 38 and transmitter 40 are configured to receive and transmit, respectively, signals in a format compatible with the primary communication scheme discussed above in connection with FIG. 3. Those skilled in the art will appreciate that receiver 38 and transmitter 40 may desirably share certain components, such as a synthesizer, oscillator, and/or timing circuits (not shown) to simplify the design of controller 20. In addition, transmitter 40 and receiver 38 may desirably utilize different antennas. However, antenna 34 defines the location of site 22 (see FIGS. 1-2), and compensation on the below-discussed procedures is required if either of such antennas are not located substantially at site 22.

Receiver 38 and transmitter 40 each couple to a processor 42. Processor 42 additionally couples to a timer 44 and a memory 46. In one embodiment, processor 42 additionally couples to a signal source (not shown) to obtain a signal which controller 20 transmits as secondary communications. Processor 42 uses timer 44 to maintain the current time and to operate synchronously with the TDMA format discussed above in connection with FIG. 3. Memory 46 includes data which serve as instructions to processor 42 and which, when executed by processor 42, cause controller 20 to carry out procedures that are discussed below. In addition, memory 46 includes variables, tables, and databases that are manipulated due to the operation of controller 20.

Figure 6:
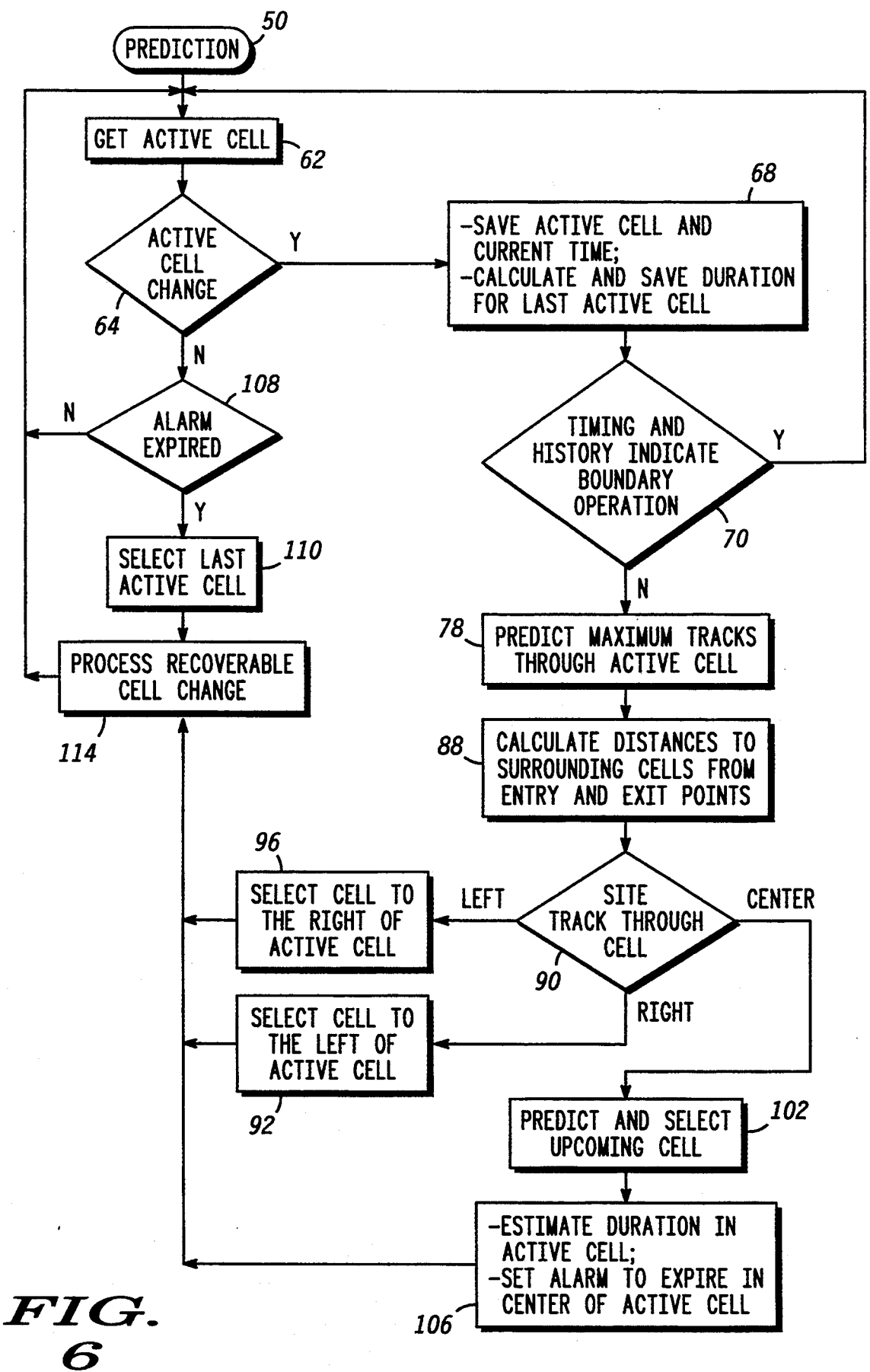
FIG. 6 shows a flow chart of a Prediction procedure performed by the secondary communication controller.

FIG. 5 shows a flow chart of a Background procedure 48 performed by controller 20. Controller 20 may desirably perform Background procedure 48 concurrently with a Prediction procedure 50, a flow chart of which is shown in FIG. 6. In a task 52 of procedure 48, controller 20 utilizes receiver 38 (see FIG. 4) to find the current active cell.

Task 52 may sample signals received during each of time slots 28 (see FIG. 3) to determine which one is the strongest. The strongest signal most probably corresponds to the active cell. Task 52 may additionally determine and evaluate Doppler of the signals to distinguish between signals transmitted from different satellites 14 (see FIG. 1). Positive Doppler signals result from approaching satellites 14 and negative Doppler signals result from receding satellites 14. Moreover, larger magnitude Doppler shifts result from satellites 14 located a further distance away from site 22 (see FIG. 1). If controller 20 is engaged in transmitting secondary communications during one of time slots 28, task 52 may desirably omit examining that time slot. As will be discussed below, this time slot corresponds to the recoverable cell, which is least likely to be the active cell, and operation of receiver 38 while transmitter 40 is operating might possibly produce invalid results.

After task 52 has determined the active cell, controller 20 performs a task 54 to synchronize controller 20 to the active cell's link parameters. In the preferred embodiment, task 54 adjusts internal timing to become synchronized with the time slot of the active cell. In other embodiments, task 54 may make frequency adjustments and demodulation technique selections. As a result of performing task 54, controller 20 can reliably receive and decode data transmitted from an overhead satellite 14 (see FIG. 1) using the link parameters of the current active cell.

A task 56 decodes and saves the identity of the active cell from data communications transmitted over the active cell's communication link. The identity may, for example, be conveyed by data which distinguish one of the cells in the above-discussed seven-cell frequency reuse scheme from the remaining six cells.

A task 58 is performed by an embodiment of the present invention which causes controller 20 to act as a terrestrial rebroadcasting station in a paging system. In particular, task 58 queues the communications received over the active cell's communication link for rebroadcasting. In the preferred embodiment, these communications represent substantially all transmissions received over the active cell's communication link in a given duration, such as a frame 30 (see FIG. 3). However, nothing prevents processing the communications to filter out specified communications from being rebroadcasted.

A task 60 transmits any queued communications using the recoverable cell's link parameters. The communications may be the ones discussed above in connection with task 58. In an alternative embodiment, the communications may be sampled voice or other data obtained from another signal source. Preferably, the determination of the recoverable cell's link parameters and the programming of transmitter 40 to operate in accordance with these parameters have already been accomplished through the operation of Prediction procedure 50, as discussed below.

After task 60, program control returns to task 52 to repeat Background procedure 48. Thus, procedure 48 repetitively monitors primary communications to maintain the identity of the active cell in a current state and repetitively transmits any communications queued for transmission.

With reference to FIG. 6, Prediction procedure 50 performs a task 62 to obtain the identity of the current active cell. This identity data was previously saved during task 56, discussed above, and is being continuously updated. A query task 64 compares the identity of the currently active cell with the identity of the last known active cell to determine whether the identity of the active cell has changed.

Controller 20 may desirably maintain a data structure in memory 46 that is similar to a path table 66 Shown in FIG. 7. Table 66 associates an active cell identity with an entry time and a duration in a one-to-one correspondence. Table 66 may include such data for any number of active cells. Table 66 is preferably arranged so that the sequence of active cells experienced by controller 20 is readily determined. Referring back to FIG. 6, task 64 may access table 66 to determine if the data listed therein as the current active cell matches the active cell identity obtained in task 62. Those skilled in the art will appreciate that task 64 may incorporate one or more data smoothing processes in making its determination. Thus, task 64 may desirably determine that an active cell change has occurred only after timing or other data suggest that a change is stable.

When task 64 determines that the identity of the active cell has changed, controller 20 predicts the identity of the recoverable cell. Specifically, a task 68 saves the identity of the new active cell and the current time in table 66 (see FIG. 7). In addition, task 68 calculates and saves the duration for which the previous active cell was active. This duration may be calculated using the current time and using the entry time saved in table 66 with the identity of the old active cell.

After task 68, a query task 70 determines whether timing and historical considerations suggest that controller 20 is experiencing a boundary between two cells.

Figure 8:
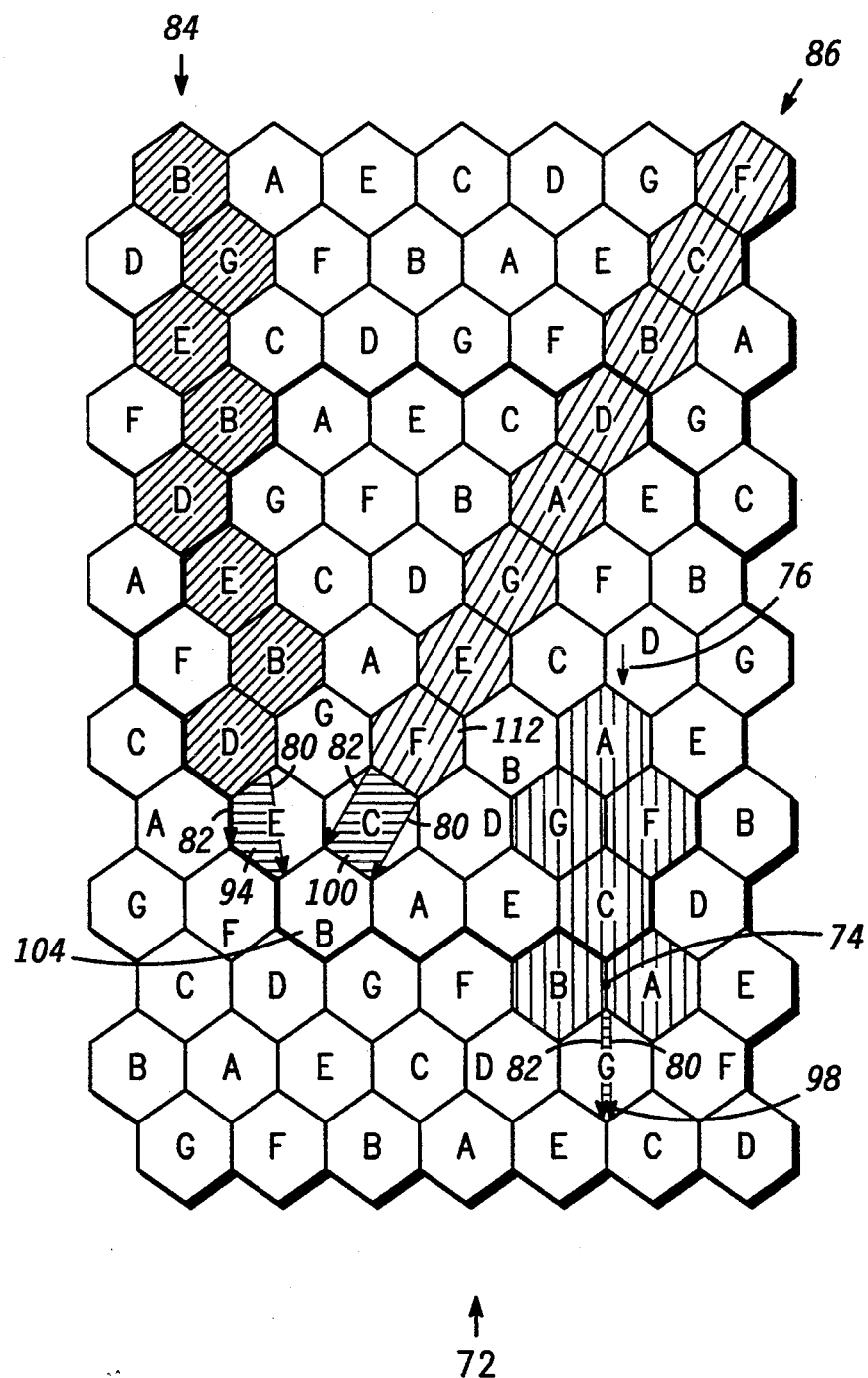
FIG. 8 shows a graphic representation of a cell orientation map maintained in the memory of the secondary communication controller.

FIG. 8 shows a graphic representation of an exemplary cell orientation map 72 stored in memory 46 of controller 20. Map 72 contains data which defines the predetermined relative orientation of cells 24 (see FIG. 2). A point 74 in map 72 resides on a boundary between two cells. If movement of cells 24 causes site 22 (see FIGS. 1-2) to move along a path 76, identified by shaded cells in map 72, then movement along a border between two cells may occur. An oscillation between adjacent active cells, such as "B" and "A" cells near point 74, provides timing considerations which can suggest movement along a border. In addition, the previous active cells, such as "C", "G/F" and "A" cells in path 76 provide historical data which suggest movement along a border.

With reference back to FIG. 6, when task 70 determines that movement along a border is occurring, program control returns to task 62 to re-examine the current active cell for another change. No change in the existing prediction of the recoverable cell will occur. Through the operation of task 70, controller 20 will refrain from unnecessarily changing the recoverable cell definition too often.

However, when task 70 determines that an active cell change has been detected and movement along a cell border is not suggested, then a task 78 is performed.

Task 78 predicts two maximum tracks through the new active cell. With reference back to FIG. 8, three example paths are illustrated. The two maximum tracks represent right-most and left-most tracks 80 and 82, respectively, which cause a straight line to pass through the previously active cells recorded in table 66 (see FIG. 7) without passing through cells not recorded in table 66. While the terms "right" and "left" are used with respect to the direction of movement of a satellite with respect to site 22, those skilled in the art will appreciate that the "right" and "left" distinction is merely for convenience of explanation. FIG. 8 illustrates tracks 80 and 82 in connection with each of the three example paths. A straight line is chosen because satellites 14 move in a repeatable, predetermined manner with respect to site 22, and that manner approximates a straight line.

The areas between sets of tracks 80 and 82 represent the portions of the new active cells where site 22 may be located within the immediate future. In the examples depicted in FIG. 8, site 22 may occupy any point within a very narrow strip which extends across the middle of a "G" cell when path 76 is being followed. Site 22 may occupy any point within generally the right side, with respect to the direction of movement, of an "E" cell when a path 84 is being followed. And, site 22 may occupy any point within a wide region through the middle of a "C" cell when a path 86 is being followed. Of course, those skilled in the art will appreciate that site 22 may follow any track through a cell 24, not just the examples illustrated in FIG. 8. Moreover, those skilled in the art will appreciate that, generally speaking, the areas potentially occupied by site 22 can be determined with greater precision as more data describing previously active cells become available. However, a predetermined limit may be placed on the amount of data used in predicting maximum tracks through a cell to reduce processing time.

With reference back to FIG. 6, after task 78 has predicted maximum tracks 80 and 82, a task 88 calculates distances between the entry and exit points for tracks 80 and 82 in the new active cell on one hand, and all immediately surrounding inactive cells on the other hand. Twenty four distance calculations may be performed. The four calculations performed for each of the six inactive cells may be added together to produce six distance sums. A query task 90 then evaluates the distance sums to determine which type of track through the new active cell site 22 is likely to take.

If task 90 determines that site 22 will take a track through the right side of the active cell, without substantially entering the left side, as shown in connection with path 84 in FIG. 8, then a task 92 is performed. Task 92 selects the cell to the left of the active cell to use as the recoverable cell. For path 84 this is a "C" cell for the situation depicted in FIG. 8. All "C" cells will remain at least a distance approximately equal to the radius of a cell 24 away from site 22 while the "E" cell 94 of path 84 remains active. If task 90 determines that site 22 will take a track through the left side of the active cell without significantly entering the right side, then a task 96 is performed. Task 96 selects the cell to the right of the active cell to use as the recoverable cell. This situation is not depicted in FIG. 8, but represents the mirror image of the situation depicted in connection with cell 94.

Task 90 may conclude that the track of site 22 is going through a left or right side of a cell when one of the distance sums is substantially larger than the rest. Of course, those skilled in the art may devise any other suitable algorithm which leads to these conclusions.

Task 90 may desirably determine that the narrow track depicted in cell 98 of FIG. 8, is either a left or right track and route program control accordingly. In this situation, either the left "F" or right "D" cell may be selected as the recoverable cell while site 22 follows the narrow track through the center of cell 98.

On the other hand, task 90 may evaluate the distance calculations to predict a wide track down the center of an active cell, as shown in cell 100 in FIG. 8. The wide track down the center of cell 100 means that controller 20 cannot tell with reasonable certainty whether cells to the left or right of the active cell would make the best choice for the recoverable cell. Consequently, a task 102 predicts which cell is the previously active cell or which will be the next active cell and selects one or the other as the recoverable cell. With reference to FIG. 8, task 102 may determine the "F" cell 112 is the preferred active cell and predict that a "B" cell 104 is the upcoming cell by extending the average of maximal tracks 80 and 82 from currently active cell 100 in path 86. Those skilled in the art will appreciate that this prediction will turn out to be in error on occasion. Nevertheless, when site 22 enters a new active cell under conditions which suggest a track similar to the one shown in cell 100, the previous cell or the upcoming cell will still be a distance at least a radius of cells 24 away from the current location.

With reference back to FIG. 6, after task 102 predicts and selects the upcoming cell as the recoverable cell, a task 106 estimates the duration that the currently active cell will remain active and sets a timer so that an alarm will expire in approximately the center of the currently active cell. The duration estimate may be achieved from knowledge about the predetermined speed of satellites 14 (see FIG. 1) and about the average predicted track through the currently active cell. This average predicted track extends half way between left and right tracks 80 and 82 (see FIG. 8). Task 106 may desirably set an alarm to expire at approximately one half of that duration from the current time, less a small predetermined constant duration to account for the fact that task 106 may not be performed until site 22 is actually past the border and within a new active cell.

With reference back to task 64, when controller 20 determines it has not entered a new active cell, a query task 108 determines whether any alarm potentially set in task 106 has expired. So long as an alarm has not expired, program control returns to task 62 to re-evaluate the current active cell data. When task 108 decides that the alarm has expired, a task 110 is performed to select the last active cell as the recoverable cell. With reference to FIG. 8, when "C" cell 100 in the example depicted by path 86 is the current active cell, "F" cell 112 is the last active cell. Thus, when site 22 reaches the approximate center of "C" cell 100, the identity of the recoverable cell changes from "B" cell 104 to "F" cell 112. This keeps the recoverable cell a distance approximately equal to at least a radius of a cell 24 away from the actual location of site 22 within the active cell.

After a recoverable cell has been selected by one of tasks 92, 96, 102/106, or 110, program control proceeds to a task 114. Task 114 processes the recoverable cell change. This processing may include, for example, the inclusion of controlling data with communications queued for transmission in task 60 of Background procedure 48 (see FIG. 5). Such controlling data may inform receivers monitoring such communications of the new link parameters to be used for future communications, and the future point in time at which the link parameters will change. This controlling data may simulate, for example, the controlling data which satellites 14 generate and transmit to receivers of primary communications when such communications are being handed off from cell to cell. Thus, receivers of primary communications may serve as receivers of secondary communications without alteration.

The new link parameters may be obtained by consulting a table stored in memory 46 (see FIG. 4), which may desirably have a structure similar to a link parameter table 116, shown in FIG. 9. Table 116 associates link parameters with the identity of each cell that may be selected as the recoverable cell. These parameters may include a definition of the time slot 28 (see FIG. 3) associated with the transmit portion of each cell and any other communication link parameters needed to fully distinguish the communication links used in each cell from one another. In various embodiments of the present invention, such other parameters may include a specification of frequency channels to be used and/or modulation techniques to be used. Task 114 may use the newly selected recoverable cell identity as a key into table 116.

In the preferred embodiment, only transmit channels from the perspective of satellites 14 (see FIGS. 1 and 3) are used for secondary communications. The curvature of the earth prevents interference between a near-earth receiver of secondary communications transmitted from near the surface of the earth and a near-earth receiver of primary communications transmitted from a satellite 14 to a location at least a cell radius away from site 22. On the other hand, receive channels from the perspective of satellites 14, may suffer interference between primary and secondary communications because a direct line of sight exists between site 22 and a satellite 14 as well as from a transmitting device located in the recoverable cell and satellite 14. For this reason, table 116 might identify only time slots associated with transmissions from satellites 14.

After informing equipment receiving secondary communications that an upcoming link change is about to take place, task 114 may then program transmitter 40 (see FIG. 4) with the appropriate link parameters from table 116 at the appropriate time to effect the communication link change. After task 114, program control returns to task 62 to re-evaluate the current active cell identity.

In accordance with the present invention, a communication unit 18 (see FIG. 1) which is capable of receiving primary cellular RF communications transmitted from satellites 14 need not be modified, enhanced, or otherwise altered to receive secondary communications transmitted from controller 20. Rather, secondary communications take place over the same link parameters as are used for primary communications. Units 18 may desirably select the strongest available one of the communication links available to it. If controller 20 is located nearby, units 18 may conclude that secondary communications from controller 20 are stronger than primary communications from an overhead satellite 14. Units 18 will then lock onto the secondary communications rather than primary communications. The placement of controllers 20 in urban areas may be desirable to improve reception of paging communications transmitted from satellites 14.

In summary, the present invention provides an improved communication system which utilizes a spectrum that is geographically allocated for reuse in accordance with a cellular pattern. The present invention provides a controller which recovers a portion of that spectrum for reuse to convey secondary communications. The controller transmits paging or other types of communications using a portion of the spectrum assigned to an inactive cell without causing interference in that inactive cell. A paging system may be constructed using these controllers to receive and rebroadcast signals obtained from satellites traveling in low-earth orbits. Page-receiving equipment in such a system may operate in only a single mode without needing to distinguish between primary and secondary communications.

The present invention has been described above with reference to preferred embodiments. However, those skilled in the art will recognize that changes and modifications may be made in these preferred embodiments without departing from the scope of the present invention. For example, those skilled in the art will appreciate that the particular algorithms discussed herein for use in predicting future active cells and paths through active cells represent examples from a range of algorithms that may be used for prediction purposes. Those skilled in the art will appreciate, for example, that past active cell duration information may be combined with past active cell identity information to more precisely predict potential tracks through an active cell. Likewise, improvements in precision may be obtained by describing possible tracks through past active cells as arcs rather than straight lines. These and other changes and modifications which are obvious to those skilled in the art are intended to be included within the scope of the present invention.

What is claimed is:

1. A method of recovering a portion of a communication spectrum geographically allocated in a cellular pattern comprising a plurality of cells, a site being located in an active cell and being located outside of a plurality of inactive cells, said site and said cells moving relative to each other in a predetermined manner, said method comprising the steps of:

receiving, at said site, a signal;
determining a first set of link parameters based on said signal, said first set of parameters being associated with said active cell;
predicting a second set of link parameters, said second set of link parameters being associated with one of said inactive cells that is unlikely to be interfered with by a transmission using spectrum defined by said second set of link parameters;
repetitively determining a current location of said site with respect to said cells;
changing said second set of link parameters in response to changes in said current location; and
transmitting a communication in the active cell using a communication spectrum defined by said second set of link parameters which uses a frequency associated with one of said inactive cells.

2. A method as claimed in claim 1 additionally comprising the step of locating an antenna so that said transmitting step occurs proximate said site.

3. A method as claimed in claim 1 additionally comprising the step of locating an antenna so that said transmitting step occurs proximate the surface of the earth.

4. A method as claimed in claim 1 wherein said predicting step comprises the step of determining the one of said inactive cells that is least likely to suffer interference as a result of said transmitting step.

5. A method as claimed in claim 1 wherein said predicting step comprises the step of selecting the one of said inactive cells for which a closest portion thereof is at least a distance approximately equivalent to a radius of said active cell away from said site.

6. A method as claimed in claim 1 wherein:
a network communication node manages said spectrum so that a transmit portion of said spectrum in said cells is dedicated to transmissions from said node and a receive portion of said spectrum in said cells is dedicated to receptions at said node; and
said predicting step comprises the step of restricting said second set of parameters to characterizing only said transmit portion of said spectrum.

7. A method as claimed in claim 1 additionally comprising the step of positioning said site to achieve clear reception of said signal from a satellite.

8. A method as claimed in claim 1 wherein one or more network communication nodes manage said spectrum so that said cells are arranged with respect to one another in a predetermined orientation, and said predicting step additionally comprises the steps of:
repetitively analyzing said signal to identify said active cell at said site;
repetitively saving data describing said identity;
recording data that describe said predetermined orientation; and
selecting said second set of parameters in response to said current active cell identity, identities of one or more previously active cells, said predetermined orientation, and said predetermined manner of movement.

9. A method as claimed in claim 1 wherein said receiving step receives said communication and said transmitting step rebroadcasts said communication.

10. A method as claimed in claim 1 wherein:
said predicting step additionally comprises the step of identifying when said identity of said active cell at said site changes;
said predicting step additionally comprises the step of monitoring durations which transpire after changes in said active cell identity; and
said selecting step comprises the step of basing said second set of parameters upon said durations.

11. A method as claimed in claim 10 wherein:
said first and second sets of link parameters comprise first and second data describing first and second time slots, respectively, of a TDMA communication channel; and
said predicting step comprises the step of processing said first data to generate said second data.

12. An apparatus for controlling secondary communications so that primary communications conducted within a cellular communication system are not interfered with, said primary communications being conducted in accordance with a set of active link parameters which characterize an active cell of said cellular communication system and a plurality of sets of inactive link parameters which characterize inactive cells, said apparatus comprising:
an antenna;
a receiver coupled to said antenna for receiving said primary communications;
a timer to monitor durations for which said cells remain active;
control means, coupled to said receiver and said timer, for determining said set of active link parameters based on said primary communications and predicting one of said sets of inactive link parameters in response to said durations; and
a transmitter coupled to said control means, for transmitting secondary communications in the active cell in accordance with said one set of inactive link parameters which uses a frequency associated with one of said inactive cells.

13. An apparatus as claimed in claim 12 additionally comprising an antenna coupled to said transmitter and located proximate the surface of the earth.

14. An apparatus as claimed in claim 12 wherein said apparatus additionally comprises an antenna coupled to said transmitter and located at a site, and said control means comprises:
means for determining a location of said site within a first cell of said cellular communication system;
means, coupled to said location determining means, for identifying a second cell within said cellular communication system, said second cell being located adjacent to said first cell and being located with respect to said site so that interference with primary communications in said second cell is unlikely, relative to other cells adjacent to said first cell of said cellular communication system, as a result of transmitting said secondary communications from said antenna; and
means, coupled to said identifying means, for determining link parameters associated with said second cell.

15. A method of operating a rebroadcasting station utilized in a cellular paging system in which page communications originate from at least one satellite in a moving orbit and are rebroadcast to increase paging signal levels in areas proximate said station, said method comprising the steps of:
(a) receiving, at a site, said page communications transmitted from said satellite;
(b) identifying a currently active cell of said cellular system based on where said site is located;
(c) predicting an area within said currently active cell which will travel over said site;
(d) identifying an adjacent cell to said currently active cell for which a closest portion thereof is at least a distance approximately equivalent to a cell radius away from said site;
(e) obtaining link parameters which characterize paging system transmissions from said satellite in said adjacent cell; and
(f) transmitting said page communications in accordance with said link parameters.

16. A method as claimed in claim 15 additionally comprising the step of locating an antenna so that said transmitting step occurs proximate the surface of the earth.

17. A method as claimed in claim 15 wherein said cells move with respect to said site in a predetermined manner, and said method additionally comprises the step of continuously performing said steps (a), (b), (c), (d), and (e) so that said link parameters utilized in said step (f) change in response to movement of said cells with respect to said site.

18. A method as claimed in claim 17 wherein said cells are arranged with respect to one another in a predetermined orientation, and said method additionally comprises the steps of:

recording data that describe said predetermined orientation;

continuously saving data describing said identity of said currently active cell; and selecting said link parameters in response to said currently active cell identity, identities of one or more previously active cells, and said predetermined orientation.

19. A method as claimed in claim 18 additionally comprising the steps of:

identifying when said identity of said active cell at said site changes;

monitoring durations which transpire after changes in said active cell identity; and basing said link parameters upon said durations.

* * * * *